United States Patent [19]

McAllister

[11] Patent Number: 5,485,311
[45] Date of Patent: Jan. 16, 1996

[54] METHOD OF INCREASING RETROREFLECTIVE BRIGHTNESS IN A RETROREFLECTIVE SHEET MATERIAL

[76] Inventor: Richard McAllister, 30 Harrow Place SW, Calgary, Alberta, Canada, T2V 3A9

[21] Appl. No.: 369,926

[22] Filed: Jan. 6, 1995

[51] Int. Cl.[6] .................................................. G02B 5/124
[52] U.S. Cl. ..................... 359/530; 359/900; 264/1.9
[58] Field of Search ............................. 359/529, 530, 359/534, 546, 900; 156/60, 230; 264/1.9, 319; 428/161, 172

[56] References Cited

U.S. PATENT DOCUMENTS 4,938,563  7/1990  Nelson et al. ..................... 359/530
5,171,624  12/1992  Walter ................................ 428/156

FOREIGN PATENT DOCUMENTS 443759  3/1936  United Kingdom .................. 359/529

*Primary Examiner*—James Phan
*Attorney, Agent, or Firm*—Anthony R. Lambert

[57] ABSTRACT

A method of increasing retroreflective brightness in a retroreflective sheet material. The retroreflective sheet material has a multitude of prism-like reflective elements imbedded in a transparent polymer plastic top film and glued by a grid of adhesive to a backing sheet. The method includes the step of heating the retroreflective sheet material until bubbles form in the transparent polymer plastic top film containing the prism-like reflective elements. The bubbles are confined by the grid. The bubbles serve as miniature magnifying lenses which increase retroreflective brightness and increase the exposure area thereby providing a wider observation angle.

1 Claim, 4 Drawing Sheets

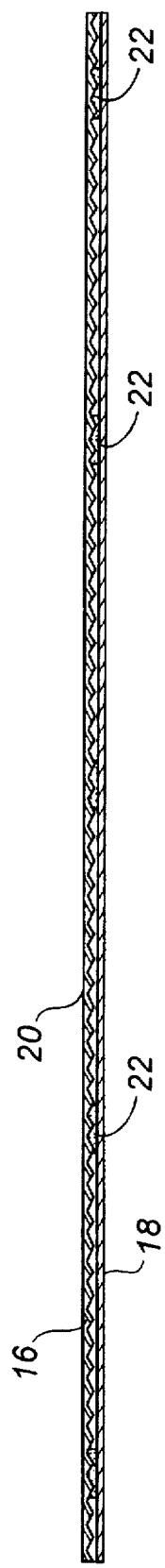
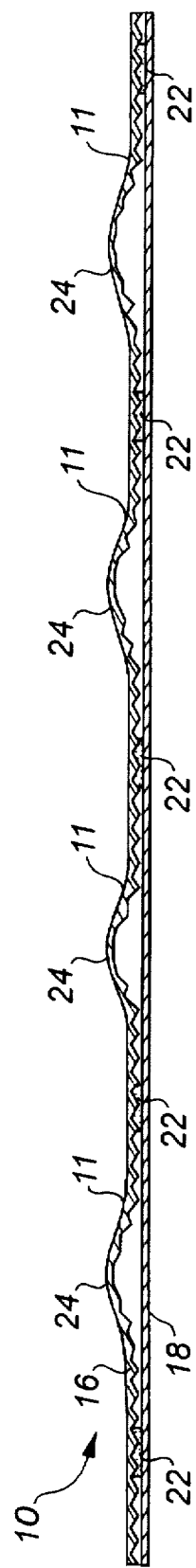

METHOD OF INCREASING RETROREFLECTIVE BRIGHTNESS IN A RETROREFLECTIVE SHEET MATERIAL

FIELD OF THE INVENTION

The present invention relates to a method of increasing retroreflective brightness in a retroreflective sheet material having a multitude of prism-like reflective elements covered by a transparent polymer plastic top film.

BACKGROUND OF THE INVENTION

U.S. Pat. No. 4,938,563 owned by Minnesota Mining and Manufacturing Company, describes a method of manufacturing a retroflective sheet material. One side of a transparent polymer plastic film is embossed with an array of reflecting elements. The composite of reflective elements and transparent film is then backed by a layer of material to strengthen the composite and protect the reflective elements from dirt or moisture. The opposite side of the transparent polymer plastic film, the side which is not embossed, serves as a transparent top film for the reflective elements.

The Minnesota Mining and Manufacturing Company patent describes deficiencies in retroreflective sheet material. In the past the cone of reflected light from the reflective elements was too narrow for many uses. When an effort was made to spread the light to increase the observation angle from which the retroreflective sheet material could be seen, much of the spread light was wasted leaving the retroreflective brightness of the article significantly reduced. The resulting retroreflective sheet material had diminished retroreflective brightness while still having a limited observation angle.

SUMMARY OF THE INVENTION

What is required is a method of increasing retroreflective brightness in a retroreflective sheet material.

According to the present invention there is provided a method of increasing retroreflective brightness in a retroreflective sheet material. The retroreflective sheet material has a multitude of prism-like reflective elements covered by a transparent polymer plastic top film and glued by a grid of adhesive to a backing sheet. The method includes the step of heating the retroreflective sheet material until bubbles form in the transparent polymer plastic top film containing the prism-like reflective elements. The bubbles are confined by the grid of adhesive. The bubbles serve as miniature magnifying lenses which increase retroreflective brightness and widen the observation angle.

BRIEF DESCRIPTION OF THE DRAWINGS

These and other features of the invention will become more apparent from the following description in which reference is made to the appended drawings, wherein:

FIG. 4 is a side elevation view in section of the retroreflective sheet material illustrated in FIG. 1.

FIG. 5 is a side elevation view in section of a retroreflective sheet material that has been treated in accordance with the teachings of the present invention.

DETAILED DESCRIPTION OF THE PREFERRED EMBODIMENT

The preferred method of increasing retroreflective brightness in a retroreflective sheet material will now be described with reference to FIGS. 1 through 6.

Figure 1:
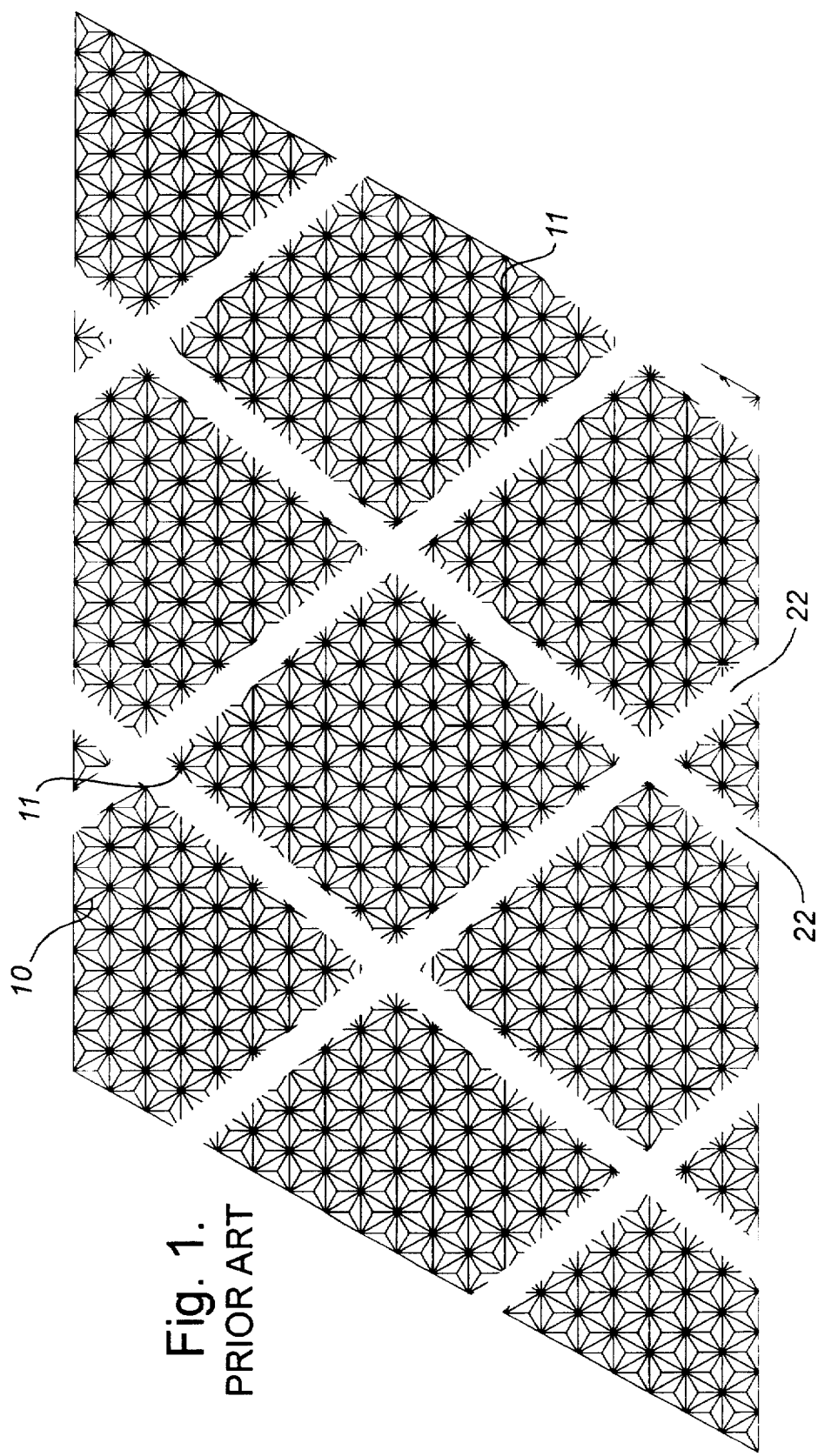
FIG. 1 is a perspective view of a retroreflective sheet material labelled as PRIOR ART.
Figure 2:
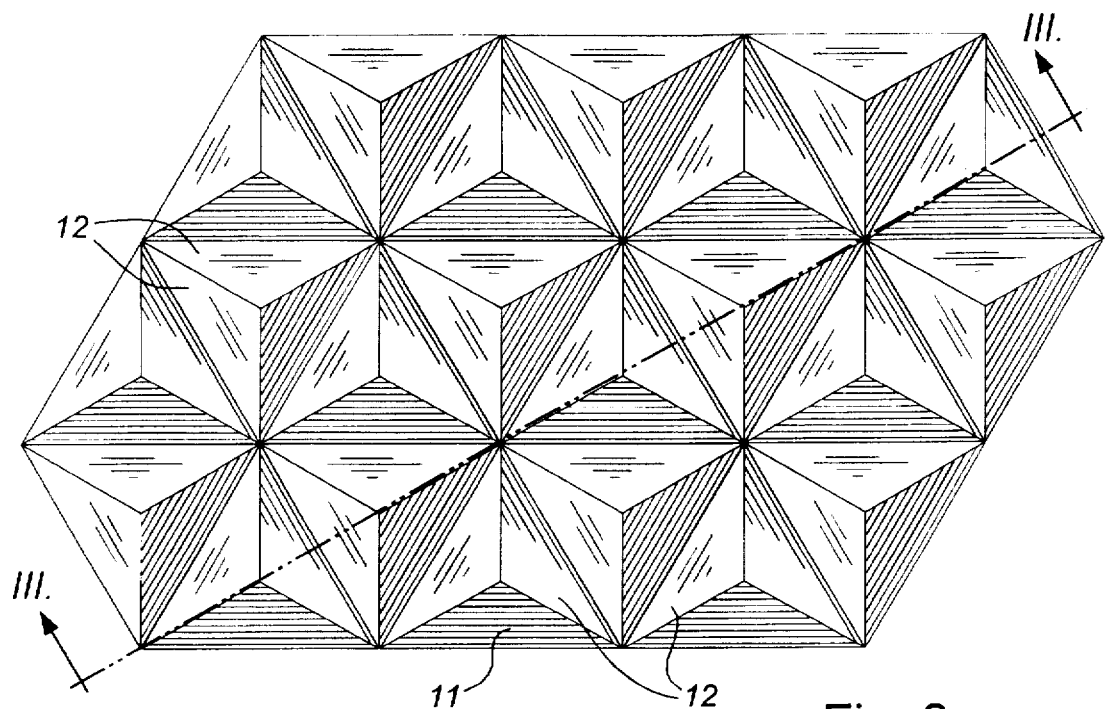
FIG. 2 is a magnified perspective view of the retroreflective sheet material illustrated in FIG. 1.
Figure 3:
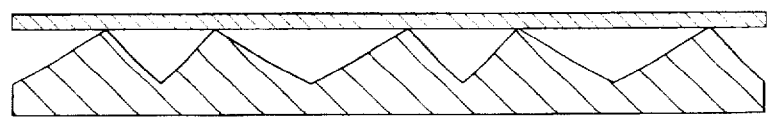
FIG. 3 is a section view taken along section lines III—III of FIG. 2.

FIGS. 1 through 4, illustrate the PRIOR ART that served as the starting point of the present invention. Referring to FIG. 1, a retroreflective material 10 is illustrated that is divided into a plurality of diamond shaped sections to form a grid-like appearance. Referring to FIG. 2, a closer examination of one of diamond shaped sections 11 of retroreflective material 10 reveals a plurality of reflective elements 12. Referring to FIG. 3, one side 14 of a transparent polymer plastic film 16 is embossed with an array of reflective elements 12. The composite of reflective elements 12 and transparent film 16 is then backed by a backing sheet 18 to strengthen the composite and protect reflective elements 12 from dirt or moisture. An opposite side 20 of transparent polymer plastic film 16, the side which is not embossed, serves as a transparent top film containing within it reflective elements 12. Referring to FIGS. 1 and 4, transparent film 16 is secured to backing sheet 18 by a grid of adhesive 22. It is this grid of adhesive 22 that provides retroreflective material 10 the grid-like appearance so apparent in FIG. 1.

Figure 6:
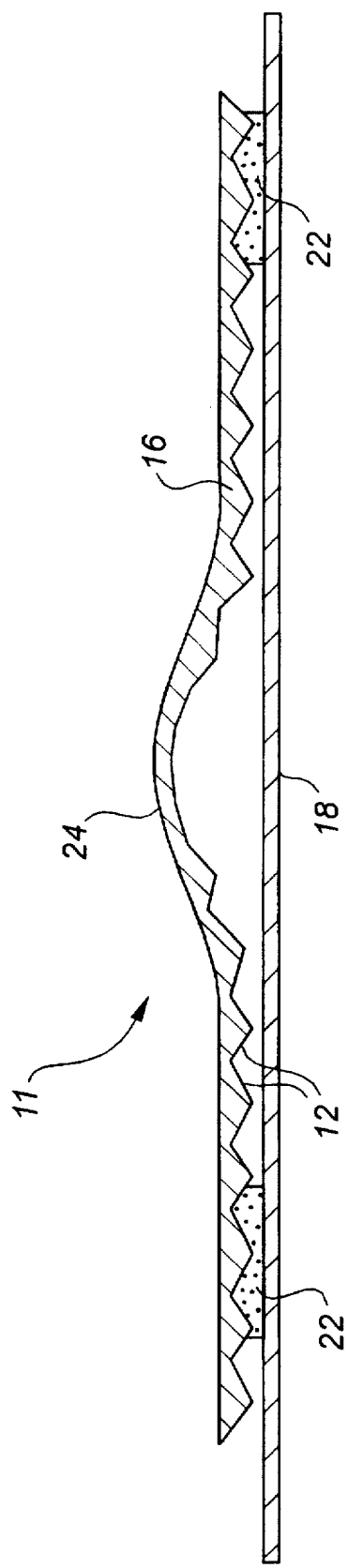
FIG. 6 is a magnified side elevation view in section of a portion of the retroreflective sheet material illustrated in FIG. 5.

Referring to FIGS. 5 and 6, the method includes the step of heating retroreflective sheet material 10 until bubbles 24 form in transparent polymer plastic top film 16 over each diamond shaped section 11 containing prism-like reflective elements 12. Polymer plastic top film 16 containing prism-like reflective elements, when heated, expands producing a bubble 24. The expansion occurs due to hot gases trapped between top film 16 and backing sheet 18. Bubbles 24 form within each diamond shaped section 11 and are confined by grid of adhesive 22 creating uniform pattern of bubbles. Each of bubbles 24 serving as a miniature magnifying lens. The bubbles provide a greater exposure area which both increases retroreflective brightness and widens the observation angle.

Beneficial results have been obtained by heating retroreflective sheet material 10 with heated air to temperatures of approximately 380 degrees fahrenheit. Once the bubble effect is achieved retroreflective sheet material 10 is immediately cooled. Care must be taken to closely monitor retroreflective sheet material 10 during the heating process. If the adhesive breaks down as a result of the heat the bubbles will spread to unwanted areas. If the bubbles burst, the beneficial effects will be lost.

It will be apparent to one skilled in the art that modifications may be made to the illustrated embodiment without departing from the spirit and scope of the invention as defined by the claims.

The embodiments of the invention in which an exclusive property or privilege is claimed are as follows:

1. A method of increasing retroreflective brightness in a retroreflective sheet material having a multitude of prism-like reflective elements contained within a transparent polymer plastic top film, the top film adhering in a grid pattern to a backing sheet, comprising the step of:

heating the retroreflective sheet material until bubbles form in the transparent polymer plastic top film containing within it the prism-like reflective elements, the bubbles being confined by the grid, the bubbles serving as miniature magnifying lenses which increase retroreflective brightness and widen the observation angle.

* * * * *